Figure 1:
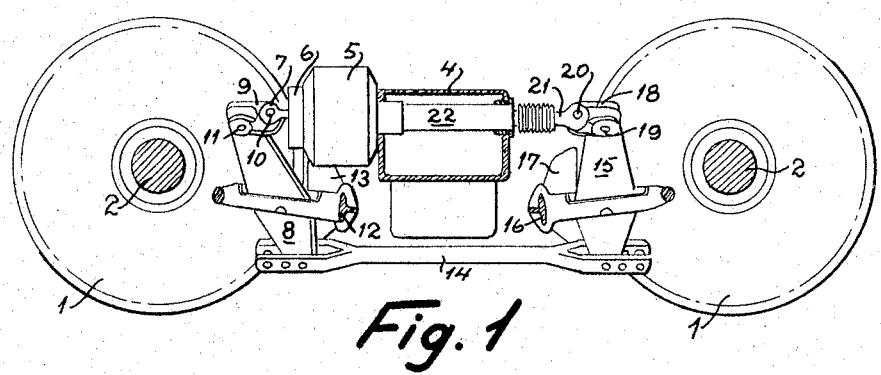

United States Patent Office 3,297,116
Patented Jan. 10, 1967

3,297,116
SLACK ADJUSTERS
Nils Börje Lennart Sander and Ingmar Valentin Larsson, Malmo, Sweden, assignors to Svenska Aktiebolaget Bromsregulator, Malmo, Sweden
Filed Jan. 4, 1965, Ser. No. 423,033
Claims priority, application Great Britain, Jan. 7, 1964, 636/64
7 Claims. (Cl. 188—196)

This invention relates to an automatic slack adjuster for a vehicle brake system comprising a brake actuator, such as a piston movable in a brake cylinder.

Such slack adjusters, as is well known, serve to compensate the increase in slack occurring during wear of the brake blocks and the wheel rims and for compensating the reduction in slack occurring when new brake blocks are inserted to replace worn-out ones.

Up to now it has been customary to mount automatic slack adjusters in a pulling rod of the brake systems, and conventional slack adjusters for such mounting include such comprising two nuts carried by a non-self locking screw thread on one part of a telescopic pulling rod, means being provided for liberating these nuts for rotation in suitable phases of the braking and brake releasing stroke depending on whether the pull transmitted through the slack adjuster reaches a certain value before or after completion of a certain travel of the pulling end of the slack adjuster corresponding to the desired normal slack.

While this and other types of slack adjusters have been successfully used in many instances in the past, there are, however, some cases where it may be difficult to use conventional slack adjusters, e.g. in the very short riggings used on railway trucks or on locomotives. In some cases of this nature it has been possible to use slack adjusters forming a part of the piston rod in the brake cylinder, but, very often, such conventional slack adjusters are not two-way acting or they are not able to adjust throughout a sufficient range of slack.

It is an object of the invention to provide a simple, efficient and reliable automatic slack adjuster which is suitable for use in brake systems where relatively little space is available for mounting a slack adjuster.

It is another object of the invention to provide an automatic slack adjuster which is suitable for installation on a railway truck and which is able to take up a considerable braking force without causing undue stresses in the connection between the cylinder and its support in the vehicle.

Another object is to provide a brake mechanism of the kind referred to in which high braking forces may be transmitted through a two-way automatic slack adjuster which is capable of compensating for great variations in slack without unduly increasing the length of the brake mechanism.

Still another object is to provide a slack adjuster which is suitable for use in the said brake mechanism and is able to transmit great compression forces, is two-way acting, and does not function in response to elastic deformations in the brake mechanism.

Still another object of the invention is to provide an automatic slack adjuster of simple construction which incorporates substantially the same facilities and functions as the conventional double nut slack adjusters referred to above without the use of a rotatable outer barrel such as has generally been used in known constructions of this general type.

According to one aspect of the invention, an automatic slack adjuster is provided, which comprises a reference member, a sensing member movable relative to said reference member in proportion to the movement of said brake actuator, a rod pushable towards said reference member at a pushing force representative of the braking force, non-self-locking threaded means and a plurality of alternative clutching means operatively interposed between said rod and said reference member, said clutching means being alternatively engageable and disengageable in response to the pushing force in said rod and to the position of said sensing member relative to said reference member.

Further features and objects of the invention will be apparent to those skilled in the art from the following detailed description of two embodiments, reference being made to the accompanying drawings.

Before, however, proceeding to such detailed description, some definitions will be given of certain expressions to be used in the present specification and in the appended claims.

From one point of view, the slack adjuster according to the invention may be characterized principally by the manner in which the various elements of which it is composed are arranged to engage with one another, either directly or indirectly, in the axial direction of the slack adjuster. For the purposes of such characterization, in the following description the forward direction is defined as the direction of movement, during application of the brakes, of the sensing member referred to above. The expressions "front" and "rear" refer to the relative location of parts as viewed in the same direction. An element is said to be forwardly engageable with another element when the force exerted by the former element on the latter element is in the forward direction. The engagement may be either direct or indirect, i.e. through intervening elements. Similarly, an element is said to be rearwardly engageable with another element when the force exerted by the former element on the latter element is in the rearward direction. An element is said to be rotationally engageable with another element, when the engagement is of a character permitting substantially unrestrained mutual rotation of the two elements, e.g. through the intermediary of a ball bearing. Similarly, an element is said to be clutchably engageable with another element when the engagement is of a character offering substantial resistance to mutual rotation of the two elements. Examples of clutchable engagement are frictional engagement and toothed engagement. The line of distinction between rotational and clutchable engagement is whether the engagement is of a character to permit or prevent rotation of the elements referred to below under the influence of axial forces.

Figure 2:
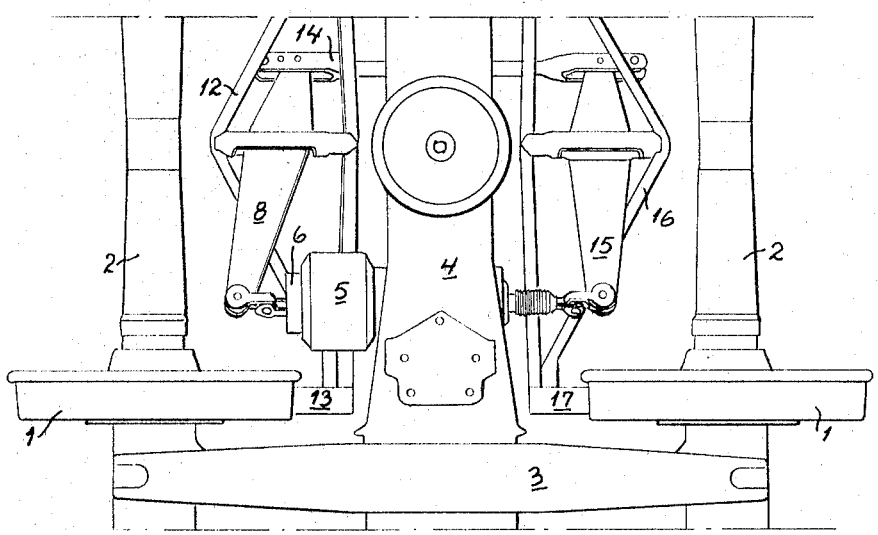
Figure 3:
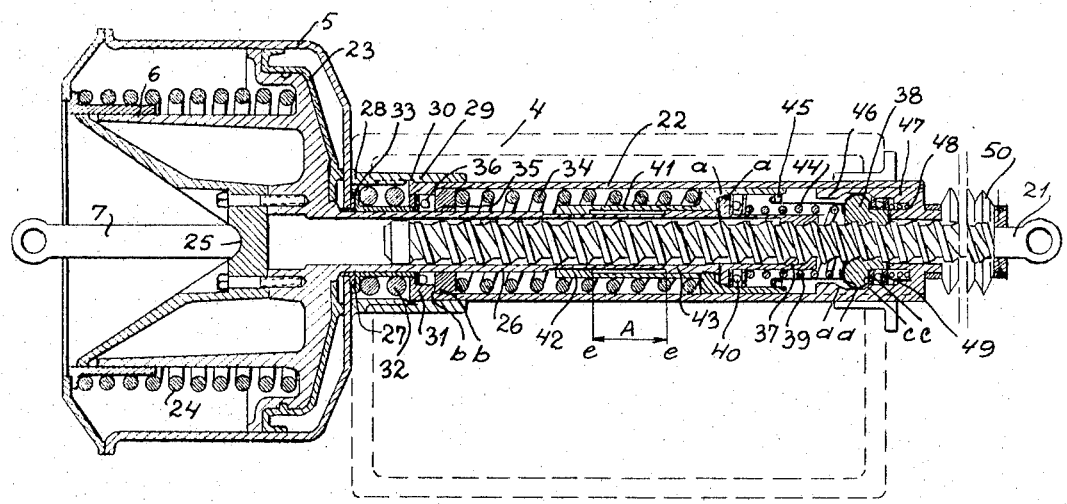
Figure 4:
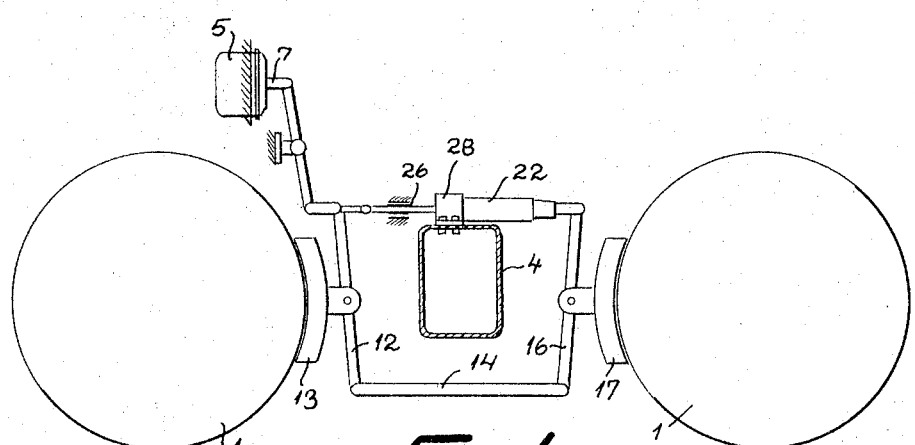
Figure 5A:
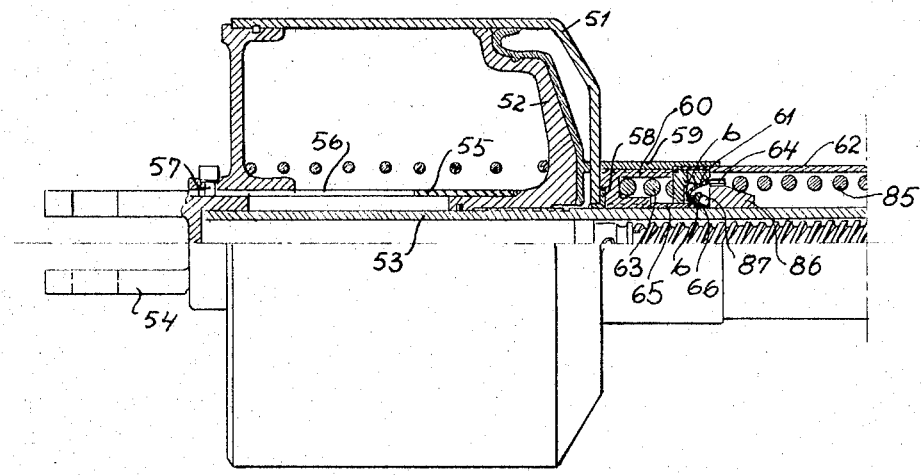
Figure 5B:
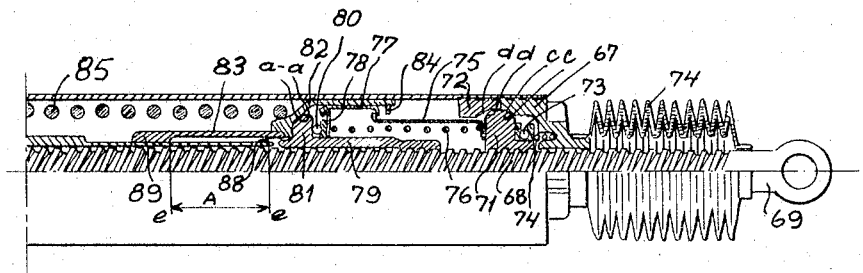

Referring now to the accompanying drawings,

FIG. 1 is a view partly in vertical section of parts of a railway truck provided with a brake mechanism including one form of an automatic slack adjuster, according to the invention, FIG. 2 is a partial plan view corresponding to FIG. 1, FIG. 3 is a vertical section of the slack adjuster forming part of the said mechanism, but on a larger scale, FIG. 4 is a diagrammatic view of a modified brake mechanism including a slack adjuster according to the invention, and FIGS. 5a and 5b are vertical sections of the front and rear portions, respectively, of a slightly modified form of a slack adjuster according to the invention.

FIGS. 1 and 2 show railway truck wheels 1 on axles 2 which are journalled in a frame 3 (not shown in FIG. 1) carrying a bolster 4. A brake cylinder 5 is supported on the bolster 4 and is provided with a piston 6 acting upon a piston rod 7 connected to a live brake lever 8 by means of a connecting link 9 having two pivots 10 and 11 with axes directed at right angles to each other and thus forming a universal joint allowing all angular displacements of the live brake lever 8 relative to the piston rod 6. A brake beam 12 carrying brake shoes 13 is pivoted to the live brake lever 8 which, at its end remote from the piston rod 7, is pivotally connected to a link 14 which, in turn, is pivoted to the lower end of a dead brake lever 15. This dead brake lever 15 carries a brake beam 16 having brake shoes 17. The parts described above are well-known elements found in many types of brake linkages for railway trucks. However, in the known types of brake linkages the upper end of the dead brake lever 15 is pivotally connected to an element in rigid connection with the brake cylinder, for example to the bolster 4.

In the construction shown in FIGS. 1 and 2, the upper end of the dead brake lever 15 is connected to a link 18 having two pivots 19 and 20 at right angles to form a universal joint similar to link 9 at the live brake lever 8. The link 18 is connected to a rod member 21 forming a part of a slack adjuster in which the rod member 21 is telescopically displaceable in a barrel 22 which is movably connnected to the brake cylinder 5 as described below with reference to FIG. 3.

It will be understood that during braking, the force from the piston rod 7 will be transmitted from the live brake lever 8 through the link 14 to the dead brake lever 15, which, in turn, will push upon the brake cylinder 5 through the slack adjuster with a force of the same magnitude as that exerted by the piston rod 7. Thus the connection between the cylinder 5 and the bolster 4 is not unduly stressed by the braking forces. The pressure exerted by the shoes 13 and 17 upon the wheel rims is counter-balanced by a tension in the truck frame, as is usual in trucks of the type in question.

The slack adjuster is shown in greater detail in FIG. 3, in which are indicated the bolster 4, cylinder 5, piston 6, rod member 21 and barrel 22. In this embodiment the cylinder 5 serves as the reference member of the slack adjuster, i.e., the element from which movements are measured and which takes up the pushing force of the slack adjuster. The piston 6 is provided with a gasket 23 and is actuated upon by a helical compression return spring 24 in conventional manner. Furthermore, the piston 6 is provided with a cup-shaped surface 25 for engaging one end of the piston rod 7, being of ordinary shape and type. The piston 6 is rigidly connected to a tubular sensing member 26 which extends through a central hole in the end of the cylinder 5, a gland 27 being provided for allowing sliding of the tubular sensing member 26 through the hole in the end of the tubular sensing member 26 through the hole in the end of the cylinder 5 without risk of air leakage. A short tubular element 28 is welded on the end of the cylinder 5, and a sleeve 29 is screwed on said element 28, the sleeve 29 having such shape that an annular groove 30 is formed between element 28 and sleeve 29. A front end cover 31 of the barrel 22 is axially slidably mounted in said groove 30, and a strong helical compression spring 32 is clamped between the end cover 31 and a sleeve 33 abutting on the gland 27. The barrel 22 is rigidly connected to the end cover 31 and contains a helical compression barrel spring 34, the left-hand end of which bears against the end cover 31 through a loose ring 35. The barrel spring 34 is pre-stressed less than the spring 32 and consequently the end cover 31 abuts on the right-hand end surface of the groove 30. A ball bearing 36 is provided between the loose ring 35 and the sleeve 33 and has axial dimension such as to leave an axial play which is less than the axial play of the end cover 31 in the groove 30.

The rod member 21 is provided with screw-threads carrying two nuts 37 and 38, the pitch being such that the engagement is non-self-locking. The nut 37 is called the leader nut and is acted upon by the force of a helical compression spring 39 through a ball-bearing 40, and a flange on the leader nut 37 is normally kept in contact with a conical surface on a sensing sleeve 41, to form a friction clutch a—a. The said sensing sleeve 41 is telescopically displaceable on the tube 26, bearing surfaces 42 and 43 being provided on the sleeve 41 and tube 26 respectively. The sleeve 41 is urged by the spring 34 towards the right in FIG. 3, but is stopped by the leader nut 37. The clutch a—a prevents relative angular movements between sleeve 41 and the leader nut 37, and the sleeve 41 is prevented from rotating by frictional contact with the barrel spring 34. The barrel spring 34 is in frictional contact with the loose ring 35 which, in turn, is in frictional contact with the end cover 31 to form a clutch b—b therewith.

The right hand end of the spring 39 abuts on a sliding spring supporting sleeve 44 mounted in sensing sleeve 41. The sleeve 44 is prevented from moving further towards the right by a split ring 45 mounted near the extreme right-hand end of the sleeve 41. The force of the spring 39 is less than the force of the spring 34.

The nut 38 is called the adjuster nut and, being mounted between a sleeve 46 in barrel 22 and an end wall 47 also rigidly connected to the barrel 22, the adjuster nut 38 has a limited axial play relative to the barrel 22. In the position shown, friction surfaces forming a clutch c—c keep the adjuster nut 38 locked to the end wall 47. The adjuster nut 38 is urged towards the left by a helical compression spring 48 through a ball-bearing 49. The force of the spring 48 is less than that of the spring 39, and consequently it cannot move the adjuster nut 38 towards the left. However, if the adjuster nut 38 is released from the force of spring 39, it will be pushed towards the left and friction surfaces forming a clutch D—D between the adjuster nut 38 and the sleeve 46 will contact each other.

A flexible protective cover 50 prevents the entrance of water and dirt between the rod 21 and end wall 47.

The brake adjuster shown in FIG. 3 will function as follows:

Upon braking, compressed air is fed into the cylinder 5 and urges the piston towards the left and the tubular sensing member 26 is thus moved towards the left in FIG. 3. As long as there is no substantial resistance in the brake linkage the tube 26 will be the only moving part in the adjuster and the distance A between vertical surfaces e—e on the sleeve 41 and the rod 26 limiting the bearing surfaces 42 and 43 will decrease.

*Normal slack during brake application*

If the slack in the brake linkage is normal, the brake shoes 13 and 17 will engage the wheel rims when the piston has been displaced through a distance equal to the distance A.

The pressure in the rod 21 will now increase substantially. A slight pressure may be transmitted from the rod 21 through the leader nut 37, clutch a—a, sleeve 41, spring 34, loose ring 35, clutch b—b, end cover 31, strong spring 32, sleeve 33 and gland 27 to the cylinder 5. When the compression force transmitted has risen to such a value that the barrel spring 34 is compressed, the rod 21 will be displaced axially towards the left, whereby the clutch c—c is disengaged and the clutch d—d is engaged. The said displacement is very small, and the compression force exceeding the force of the barrel spring 34 may now be transmitted from the rod 21 through the adjuster nut 38, clutch d—d, sleeve 46, barrel 22, end cover 31, strong spring 32, sleeve 33, and gland 27, to the cylinder 5. However, during the braking operation, the magnitude of the compression force transmitted will soon reach the force of the strong spring 32. Now the ball bearing 36 will engage the loose ring 35 and the clutch b—b will be disengaged. At this moment the surfaces e—e are engaged and a further movement of the piston 6 towards the left will cause compression of the barrel spring 34 and disengagement of the clutch a—a. However, immediately after the disengagement of the clutch a—a, the leader nut 37 will be pushed towards the left while rotating on the rod 21 owing to the force exerted by the spring 39 through the ball bearing 40. This axial movement of the leader nut 37 corresponds to the elastic deformation of the brake linkage after the engagement of the brake shoes 13 and 17 and the wheel rims.

The part of the braking force exceeding the force of the strong spring 32 will be transmitted from the rod 21 through the adjuster nut 38, sleeve 46, barrel 22, end cover 31 and the tubular element 28, to the cylinder 5.

During the subsequent release of the brakes, the braking force will decrease gradually and thus the clutch b—b will still remain disengaged during the initial stage of the return of the piston 6 towards the right. The surfaces e—e will be disengaged and the barrel spring 34 will be allowed to expand while causing the loose ring 35, the spring 34 itself, sleeve 41, sleeve 44, split ring 45, spring 39, ball bearing 40 and leader nut 37 to rotate in unison on the screw threads of the rod 21 and on the ball bearing 36, until the braking force has decreased to such a value that the clutch b—b will be engaged. This will happen when the spring support 44 engages the adjuster nut 38. When the braking force has decreased to equal the force of the barrel spring 34, the clutch d—d will be disengaged and the clutch c—c will be engaged. During the remaining part of the brake release operation, the piston 6 and tubular member 26 will be displaced towards the right until the distance between the surfaces e—e is once more A. As will be understood, during normal application of the brakes no adjustment will be carried out, regardless of the magnitude of the elastic deformations in the brake rigging. Such deformations will only cause rotation in both directions of leader nut 37 and rotation in one direction of sleeve 41.

*Braking with excessive slack in the brake mechanism*

(Take-up)

Assuming that the brake shoes 13 and 17 have become worn, the following is the braking cycle during which the slack adjuster is to reduce the slack automatically by causing the rod 21 to extend further from the barrel 22.

At first the piston 6 is moved towards the left against the rising force of the return spring 24 and the frictional resistance in the brake linkage. The tubular member 26 will take part in the leftward movement of the piston 6, and owing to the excessive slack, the surfaces e—e will be engaged prior to the engagement of the brake blocks 13 and 17 against the wheel rims. The leftward movement of piston 6 will continue and the sleeve 41 will be moved towards the left while compressing the barrel spring 34. Thus the clutch a—a will be disengaged and the leader nut 37 will start to rotate on the rod 21 until the clutch a—a is re-engaged. Thus the distance between the spring support 44 and the adjuster nut 38 will increase and reach a value hereinafer called "S" (not shown in the drawings) corresponding to the excessive slack at the moment when the braking force has caused the compression of spring 32 and thus disengaged the clutch b—b. In the meantime (when the compression force in the rod 21 reached the force of the barrel spring 34) the clutch c—c has been disengaged and the clutch d—d engaged.

During the remaining part of the brake application operation and during the first part of the release operation, the same idle motions will be performed as described above in connection with the normal operation of the brakes. Thus the leader nut 37 will continue its movement towards the left, but it will return towards the right through the same axial distance during the initial part of the release of the brake. Therefore, when the braking force during the release of the brake corresponds to the force of the spring 32, the clutch b—b will be engaged and the distance between sleeve 44 and the adjuster nut 38 will again be "S," corresponding to the excessive slack. The pressure in the cylinder 5 is still decreasing and the barrel spring 34 will try to push the rod 21 towards the right. Therefore the clutch d—d will be disengaged when the braking force becomes less than the force of the barrel spring 34. However, the clutch c—c will not be engaged, but the adjuster nut 38 will start turning on the ball bearing 49 until the sleeve 44 engages the adjuster nut 38. This will happen when the nut 38 has travelled the axial distance "S" and as a result the rod 21 has been extended further from the barrel 22 by the distance "S" towards the right and thus compensated for the excessive slack in the linkage. The remaining part of the braking cycle is the withdrawal of the piston 6 towards the right until the surfaces e—e have reached the relative axial distance A.

*Braking with insufficient slack in the brake mechanism*

(Pay-out)

If the clearance between the brake shoes 13 and 17 and the wheel rims has become too small, for example because of the insertion of new brake shoes, the slack adjuster should automatically cause a withdrawal of the rod 21 into the barrel 22 (displacement towards the left). The present slack adjuster is made so that this so-called paying out is performed only after two consective braking operations with insufficient slack. This is because an initial excessive premature resistance in the brake linkage may arise owing to dirt, rust or ice in the rigging instead of being due to insufficient slack. If the resistance is due to rust or ice, such resistance would be overcome during the first braking operation and should not cause any pay-out operation of the adjuster.

The first cycle is carried out as follows:

During the outward movement of the piston 6, the braking force reaches the value of the strong spring 32 when the distance between the surfaces e—e still has a value hereinafter called m (not shown in the drawing). Thus the axial distance "m" is that which ought to be "paid-out." The clutch c—c has been disengaged and the clutch d—d engaged, and the clutch b—b is now disengaged because of the compression of the strong spring 32. As the barrel spring 34 is substantially stronger than the spring 39, the spring 34 may now expand while causing the leader nut 37 to rotate on the rod 21 so as to be displaced towards the right. During this rotation of the nut 37 the loose ring 35, barrel spring 34, and sleeve 41 rotate in unison with the nut 37. The spring 39 will be compressed and the sleeve 44 will be stationary while the split ring 45 will be displaced towards the right through the distance m viz. the distance through which the sleeve 41 will be displaced, until the surfaces e—e engage each other.

During the remaining part of the brake application and during the first part of the release operation, i.e., when the braking force transmitted causes elastic deformations of the brake linkage, the usual idle motion of the leader nut 37 will be performed. This operation has been explained above in connection with the operation of the brake with normal slack and so is not described here again in detail. During release of the brake the clutch b—b will be engaged, the clutch d—d will be disengaged and the clutch c—c will be engaged. The distance between the adjacent parts of split ring 45 and spring support 44 will remain m and the spring 39 is thus compressed the axial distance m. This will be the case during the return of piston 6. Compared with the relative positions shown in FIG. 3 the sleeve 41 has been displaced the distance m towards the right and thus the distance between the surfaces e—e in the released brake position is A-m.

The second braking cycle:

When the second braking cycle starts no changes have been made in the length of the adjuster and consequently, when the piston 6 has been moved to the left through the distance A–*m*, there is a premature engagement of the brake blocks 13 and 17 against the wheels 1. The clutch *c—c* is disengaged when the braking force exceeds the force of the barrel spring 34, but prior to the engagement of the clutch *d—d* the spring 39 will exert a force on the adjuster nut 38 through the sleeve 44 and cause the nut 38 to rotate on the rod 21. In this rotation not only the nut 38 but also the spring 39 and sleeve 44 will take part. The barrel spring 34 will be axially compressed and the rod 21 will be moved axially towards the left corresponding to the distance *m*. The brake linkage thus has an increase in its slack corresponding to the distance *m*. The remaining braking cycle will be performed as described in the case when the slack is normal.

It will be understood that the slack adjuster shown in FIG. 3 could be used with advantage in brake mechanisms where the rigid connection between the adjuster and the brake cylinder is established through rigid parts of the vehicle or truck. Such an alternative mechanism is shown in principle in FIG. 4, in which elements corresponding to elements previously shown are provided with corresponding reference numerals. It will be seen that in this case the tubular element 28 is welded directly to the bolster 4 remote from the brake cylinder 5 and forms the reference member of the slack adjuster.

The unit of brake cylinder and slack adjuster shown in FIG. 5 comprises a brake cylinder 51 having a piston 52 which is threaded—by a low pitch thread connection—to a tubular sensing member 53 rigidly connected at its left hand end to a forked connecting element 54. This forked element is adapted to be connected to the link 9 of a rigging of the type shown in FIGS. 1 and 2. A tube 55 surrounding the sensing member 53 is welded to the piston 52 and is provided with a slot 56 into which the end of a screw 57 mounted on a cylinder cover 58 protrudes. Thus the longitudinal position of the piston 52 on the sensing member 53 may be adjusted by turning the forked element 54. The sensing member 53 extends through a central hole in the end of the brake cylinder 51, a gland 58 being provided for avoiding air leakage. A short tubular element 59 is welded on the end of the cylinder 51, and a cup shaped sleeve 60 is screwed into said element 59 and keeps the gland 58 in place. An end cover 61 is rigidly connected to a barrel 62 and said barrel 62 is mounted to slidably protrude into the tubular element 59, a strong helical spring 63 being clamped between the end cover 61 and the cup shaped sleeve 60. The end cover 61 has at its right hand end a conical surface adapted to co-operate with a corresponding conical surface on a spider sleeve 64 so as to form a friction clutch connection. A sleeve 65 having an outwardly extending flange 66 is screwed into the cup shaped sleeve 60 and the spider sleeve 64 is adaptend to be clamped between the end cover 61 and the flange 66. The adjacent surfaces on the spider sleeve 64 and the flange 66 thus form a friction clutch *b—b*.

At the right hand end of the barrel 62 a cover 67 is mounted by being screwed into the barrel. The cover 67 is provided with a cylindrical opening through which a threaded rod part 68 extends. The end of the rod part 68 outside the barrel 67 is provided with a connecting part 69 for a bolt connection to the rigging as shown in FIGS. 1 and 2. The threads of the rod 67 outside the barrel are protected by a flexible tube 70. The threads of the rod part 68 are of such high pitch as to be non-self-locking. A nut 71 called the adjuster nut is threaded on the part 67 and is provided with two conical locking surfaces, one in each of the axial directions. Corresponding locking surfaces are provided on the cover 67, to form a clutch *c—c*, and on an insert ring 72 mounted in the barrel to the left of the cover 67 to form a clutch *d—d*. Between radially extending surfaces of the adjuster nut 71 and the cover 67 a ball bearing 73 and a compression spring 74 are mounted. The spring 74 is not able to move the adjuster nut 71 towards the left as the adjuster nut 71 abuts a sleeve part 75. The said sleeve part is provided with an inwardly extending flange serving as support for a spring 76 and an outwardly extending flange adapted to coact with an inwardly extending flange of an intermediate sleeve part 77 to limit the relative axial movements between the sleeve parts 75 and 77 in the direction away from each other. A third sleeve part 78 is located slidably within the sleeve part 75 and is restricted from being drawn out by an inwardly extending flange of the sleeve part 77. The sleeve part 78 acts as a spring support for the compression spring 76 and the three sleeve parts 75, 77 and 78 will thus limit the expansion of the compression spring 76. A nut 79—called the leader nut—is threaded on the spindle 68 to the left of the sleeve part 78, a ball bearing 80 being mounted between a shoulder 81 of the feeder nut 79 and the said sleeve part 78. The shoulder 81 is provided with a toothed, conical coupling surface adapted to engage a corresponding toothed coupling surface of a coupling part 82 integral with a sensing sleeve 83. The coupling surfaces of the parts 81 and 82 thus form a coupling *a—a*. An inwardly extending shoulder of the coupling part 82 is formed by a split ring 84 mounted at an axial distance from the right hand end of the sleeve part 77 which is greater than the axial distance through which the feeder nut 79 is to be displaced in order to open the clutch *a—a*. The coupling part 82 also acts as a spring support for a barrel spring 85 the left hand end of which abuts a spring supporting ring 86. The said spring supporting ring engages a ball bearing 87 of the axial type which in turn abuts the flange 66 of the sleeve 65. The spring supporting ring 86 is connected to the spider sleeve by a connection of known type allowing relative axial movements but preventing relative angular movements. The friction clutch consisting of the adjacent surfaces of the spider sleeve 64 and the flange 66 is designated *b—b*.

The right hand end of the tubular sensing member 53 is provided with a split locking ring 88 and the left hand end of the sensing sleeve 83 is provided with an inwardly extending shoulder 89 adapted to engage the said locking ring 88. The axial distance between the coacting surfaces of these elements is designated "A" in the position shown—the position where the brakes are released.

The embodiment described and shown in FIG. 5 will operate mainly in the same way as the one shown in FIG. 3.

Upon braking the piston 52 is expelled and the tubular sensing member 53 is moved towards the left. This movement will continue until the member 53 has travelled the distance "A." Provided that the slack in the brake linkage is normal the brake shoes will engage the wheel rims at this moment.

The pressure in the rods 53 and 68 will now increase substantially. A slight pressure may be transmitted from the rod 68 through the feeder nut 79, clutch *a—a*, coupling part 82, spring 85, spring supporting ring 86, ball bearing 87 and sleeve 65 to the cylinder 51. When the force transmitted has reached such a value that the barrel spring 85 is compressed, the rod 68 will be displaced towards the left through such distance that the coupling *d—d* at the locking nut is closed. Simultaneously the coupling *c—c* is opened. The force exceeding the force of the barrel spring 15 is now transmitted from the rod 68 via the locking nut 71, the insert ring 72, barrel 62, end cover 61, strong spring 63 and the sleeve 60 to the cylinder bottom 51. The magnitude of the compression force transmitted will soon reach the force of the strong spring 63. When the end cover—caused by such transmitted force—is displaced towards the left, the clutch *b—b* is opened. At this time the surfaces *e—e* are in engagement with each other and a further outward travel of the piston will cause a corresponding travel towards the left of the sensing sleeve 83. As soon as this travel exceeds the axial distance between the locking ring 84 and the sleeve part 77 the clutch a—a will be opened and the sleeve units 75, 77, 78 will act upon the feeder nut 79 through the ball bearing 80. Thus the feeder nut 79 will start rotating on the rod part 68 and it will be displaced towards the left through an axial distance corresponding to the elastic deformations of the brake rigging, i.e. the deformations caused by forces greater than the force of the strong spring 63. The part of the force exceeding the force of the strong spring 63 will be transmitted from the barrel 62 directly to the sleeve 59 integral with the cylinder 51.

During the subsequent release of the brakes, the braking force will decrease gradually and thus the clutch b—b will remain disengaged during the initial stage of the return of the piston 52 towards the right. The barrel spring will cause the coupling part 82 and the sensing sleeve 83 to take part in said movement towards the right until the coupling a—a has been fully engaged. From now on the surfaces e—e will be moved away from each other and the barrel spring 85 will be allowed to expand while causing the spring supporting ring 86, the spider sleeve 64, the barrel spring 85 itself, the coupling part 82, the sensing sleeve 83 and the feeder nut 79 to rotate on the ball bearing 87 and the threads on the rod part 68. Simultaneously the spring 76 and the sleeve parts 75, 77 and 78 are pushed towards the right. This movement will continue until the clutch b—b has been engaged. When the braking force has decreased to equal the force of the barrel spring 85, the clutch d—d will be disengaged and the clutch c—c will be engaged. During the remaining part of the brake release operation, the piston 52 and tubular rod member 53 will be displaced towards the right until the distance between the surfaces e—e is once more A. As will be understood, during application of the brakes with normal clearance between the shoes and rims, no adjustment will be carried out, regardless of the magnitude of the elastic deformations in the brake rigging. As was the case in the embodiment of FIG. 3 such deformations will only cause rotation in both directions of the leader nut and rotation in one direction of the adjacent unit (in FIG. 5 consisting of coupling part 82 and sensing sleeve 83).

In case of excessive slack in the rigging and in case of too small slack, the take-up and pay-out operations will be performed in substantially the same manner as described in connection with the embodiment of FIGURE 3. The device according to FIG. 5 differs from that of FIG. 3 only as far as the couplings b—b and a—a are concerned. The advantage of the embodiment according to FIG. 5 is mainly that it is more capable of resisting shocks.

We claim:

1. An automatic slack adjuster for a vehicle brake system having a brake actuator, said slack adjuster comprising a reference member, a tubular sensing member movable in its longitudinal direction in proportion to the movement of said brake actuator, a rod extending into the bore of said sensing member, said rod being pushable towards said reference member at a pushing force representative of the braking force, said rod being constructed with a non-self-locking screw thread, a leader nut and an adjuster nut carried by said rod in engagement with the screw thread thereof, a sleeve slidably and rotatably surrounding said tubular sensing member, a barrel surrounding said tubular sensing member, said sleeve and said leader and adjuster nuts, said barrel being mounted for limited axial movement with respect to said reference member, a ring rotatably surrounding said tubular sensing member adjacent the forward end of said barrel, a barrel spring between said ring and said sleeve, means on said tubular sensing member and said sleeve for axially engaging same upon a predetermined travel of said sensing member from its neutral position, clutching means for holding said ring against rotation at braking forces up to a predetermined value, an adjuster spring between said leader nut and said adjuster nut, said adjuster spring being rotatably supported against said leader nut, spring detaining beans engaging between said adjuster spring and said adjuster nut, stop means on said sleeve for co-operation with said spring detaining means, said leader nut being forwardly clutchably engageable with said sleeve, said adjuster nut being alternatively forwardly and rearwardly engageable with said barrel.

2. An automatic slack adjuster for a vehicle brake system having a brake actuator, said slack adjuster comprising a reference member, a sensing member movable relative to said reference member in proportion to the movement of said brake actuator, a rod pushable towards said reference member at a pushing force representative of the braking force, said rod being constructed with a non-self-locking screw thread, a leader nut and an adjuster nut carried by said rod in engagement with the screw thread thereof, a sleeve slidably surrounding said sensing member and axially engageable thereby upon a predetermined travel of said sensing member from the position occupied thereby in the neutral position of the slack adjuster, a barrel surrounding said sensing member, said sleeve and said leader and adjuster nuts, said barrel being mounted for limited axial movement with respect to said reference member, spring means urging said sleeve rearwards relative to said barrel, spring means urging said leader nut forwards relative to said rod, spring means urging said adjuster nut forwards relative to said rod, said adjuster nut being rearwardly clutchably engageable with said barrel up to a certain value of the braking force and forwardly clutchably engageable with said barrel at braking forces above said certain value, means for holding said sleeve against rotation at braking forces below a certain value at least as high as said first mentioned value, said leader nut being forwardly clutchably engageable with said sleeve.

3. An automatic slack adjuster for a vehicle brake system having a brake actuator, said slack adjuster comprising a reference member, a sensing member movable relative to said reference member in proportion to the movement of said brake actuator, a rod pushable towards said reference member at a pushing force representative of the braking force, said rod being constructed with a non-self-locking screw thread, a leader nut and an adjuster nut carried by said rod in engagement with the screw thread thereof, a sleeve slidably surrounding said sensing member and axially engageable thereby upon a predetermined travel of said sensing member from the position occupied thereby in the neutral position of the slack adjuster, a barrel surrounding said sensing member, said sleeve and said leader and adjuster nuts, said barrel being mounted for limited axial movement with respect to said reference member, a main locking spring urging said barrel rearwards relative to said reference member, a ring rotatably surrounding said sensing member, a barrel spring between said ring and said sleeve, said ring being rearwardly clutchably engageable with said barrel, a rotatable support engageable by said ring upon compression of said main locking spring, spring means urging said leader nut forwards relative to said rod, spring means urging said adjuster nut forwards relative to said rod, said adjuster nut being rearwardly clutchably engageable with said barrel up to a certain value of the braking force and forwardly clutchably engageable with said barrel at braking forces above said certain value, said leader nut being forwardly clutchably engageable with said sleeve.

4. An automatic slack adjuster for a vehicle brake system having a brake actuator, said slack adjuster comprising a reference member, a sensing member movable relative to said reference member in proportion to the movement of said brake actuator, a rod pushable towards said reference member at a pushing force representative of the braking force, said rod being constructed with a non-self-locking screw thread, a leader nut and an adjuster nut carried by said rod in engagement with the screw thread thereof, a sleeve slidably surrounding said sensing member and axially engageable thereby upon a predetermined travel of said sensing member from the position occupied thereby in the neutral position of the slack adjuster, a barrel surrounding said sensing member, said sleeve and said leader and adjuster nuts, said barrel being mounted for limited axial movement with respect to said reference member, a main locking spring urging said barrel rearwards relative to said reference member, a ring rotatably surrounding said sensing member, a barrel spring between said ring and said sleeve, a rotatable support engageable by said ring under the influence of said barrel spring, a spider, sleeve engaging with said ring to prevent mutual rotation, but permit relative axial movement of both, said spider sleeve being clutchably engageable between a rear face of said barrel and a fixed support, spring means urging said leader nut forwards relative to said rod, spring means urging said adjuster nut forwards relative to said rod, said adjuster nut being rearwardly clutchably engageable with said barrel up to a certain value of the braking force and forwardly clutchably engageable with said barrel at braking forces above said certain value, said leader nut being forwardly clutchably engageable with said sleeve.

5. An automatic slack adjuster for a vehicle brake system having a brake actuator, said slack adjuster comprising a reference member, a sensing member movable relative to said reference member in proportion to the movement of said brake actuator, a rod pushable towards said reference member at a pushing force representative of the braking force, said rod being constructed with a non-self-locking screw thread, a leader nut and an adjuster nut carried by said rod in engagement with the screw thread thereof, a sleeve slidably surrounding said sensing member and axially engageable thereby upon a predetermined travel of said sensing member from the position occupied thereby in the neutral position of the slack adjuster, a barrel surrounding said sensing member, said sleeve and said leader and adjuster nuts, said barrel being mounted for limited axial movement with respect to said reference member, biased spring means urging said sleeve rearwards relative to said barrel, means for holding said sleeve against rotation at braking forces below a certain value at least as high as the bias of said spring means, said adjuster nut being alternatively forwardly and rearwardly engageable with said barrel, tooth means clutchably connecting said leader nut and said sleeve in the neutral position of the slack adjuster, means for detaining said leader nut relative to said sleeve upon a relative travel of both sufficient to disengage said tooth means, spring means between said leader nut and said adjuster nut, means for detaining the rear end of said last mentioned spring means with respect to said leader nut, and spring means urging said adjuster nut forwards relative to said barrel and being rotatably supported against said adjuster nut.

6. An automatic slack adjuster for a vehicle brake system having a brake actuator, said slack adjuster comprising a reference member, a sensing member movable relative to said reference member in proportion to the movement of said brake actuator, a rod pushable towards said reference member at a pushing force representative of the braking force, said rod being constructed with a non-self-locking screw thread, a leader nut and an adjuster nut carried by said rod in engagement with the screw thread thereof, a sleeve slidably surrounding said sensing member and axially engageable thereby upon a predetermined travel of said sensing member from the position occupied thereby in the neutral position of the slack adjuster, a barrel surrounding said sensing member, said sleeve and said leader and adjuster nuts, said barrel being mounted for limited axial movement with respect to said reference member, biased spring means urging said sleeve rearwards relative to said barrel, means for holding said sleeve against rotation at braking forces below a certain value at least as high as the bias of said spring means, said adjuster nut being alternatively forwardly and rearwardly engageable with said barrel, tooth means clutchably connecting said leader nut and said sleeve in the neutral position of the slack adjuster, a telescopically compressible sleeve mounted between said leader nut and said adjuster nut, a biased spring in said telescopically compressible sleeve, the latter having an axial play relative to a shoulder of said sleeve slightly greater than the overlapping of said tooth means, and spring means urging said adjuster nut forwards relative to said barrel and being rotatably supported against said adjuster nut.

7. An automatic slack adjuster for a vehicle brake system having a brake actuator, said slack adjuster comprising a reference member, a sensing member movable relative to said reference member in proportion to the movement of said brake actuator, a rod pushable towards said reference member at a pushing force representative of the braking force, said rod being constructed with a non-self-locking screw thread, a leader nut and an adjuster nut carried by said rod in engagement with the screw thread thereof, a sleeve slidably surrounding said sensing member and axially engageable thereby upon a predetermined travel of said sensing member from the position occupied thereby in the neutral position of the slack adjuster, a barrel surrounding said sensing member, said sleeve and said leader and adjuster nuts, said barrel being mounted for limited axial movement with respect to said reference member, biased spring means urging said sleeve rearwards relative to said barrel, means for holding said sleeve against rotation at braking forces below a certain value at least as high as the bias of said spring means, said adjuster nut being alternatively forwardly and rearwardly engageable with said barrel, tooth means clutchably connecting said leader nut and said sleeve in the neutral position of the slack adjuster, a telescopically compressible sleeve mounted between said leader nut and said adjuster nut, said sleeve being composed of a first sleeve part forwardly rotationally engageable with said leader nut, a second sleeve part rearwardly engageable with said first sleeve part and rearwardly engageable with an abutment of said sleeve at a play from the neutral position of the slack adjuster greater than the overlapping of said tooth means, a third sleeve part rearwardly engageable with said second sleeve part and with said adjuster nut, and a biased spring between said first and third sleeve parts, and spring means urging said adjuster nut forwards relative to said barrel and being rotatably supported against said adjuster nut.

References Cited by the Examiner
UNITED STATES PATENTS

| 2,767,811 | 10/1956 | Browall et al. | 188—196 |
| 3,249,183 | 5/1966 | Billeter | 188—196 |

DUANE A. REGER, *Primary Examiner.*